United States Patent
Klonowski et al.

(10) Patent No.: US 9,828,917 B2
(45) Date of Patent: Nov. 28, 2017

(54) RAPID ASSISTANCE DEVICE FOR A FREE TURBINE ENGINE OF AN AIRCRAFT

(71) Applicants: SAFRAN HELICOPTER ENGINES, Bordes (FR); SAFRAN ELECTRONICS & DEFENSE, Boulogne-Billancourt (FR); SAFRAN ELECTRICAL & POWER, Blagnac (FR)

(72) Inventors: Thomas Klonowski, Sedzere (FR); Michel Nollet, Boulogne Billancourt (FR); Frederic Pailhoux, Saint-Mammes (FR)

(73) Assignees: SAFRAN HELICOPTER ENGINES, Bordes (FR); SAFRAN ELECTRONICS & DEFENSE, Boulogne-Billancourt (FR); SAFRAN ELECTRICAL & POWER, Blagnac (FR)

( * ) Notice: Subject to any disclaimer, the term of this patent is extended or adjusted under 35 U.S.C. 154(b) by 0 days.

(21) Appl. No.: 15/502,017

(22) PCT Filed: Jul. 31, 2015

(86) PCT No.: PCT/FR2015/052119
§ 371 (c)(1),
(2) Date: Feb. 6, 2017

(87) PCT Pub. No.: WO2016/020607
PCT Pub. Date: Feb. 11, 2016

(65) Prior Publication Data
US 2017/0226933 A1    Aug. 10, 2017

(30) Foreign Application Priority Data

Aug. 7, 2014 (FR) ..................... 14 57671

(51) Int. Cl.
*F02C 7/26* (2006.01)
*F02C 7/268* (2006.01)
(Continued)

(52) U.S. Cl.
CPC .............. *F02C 7/268* (2013.01); *F01D 15/10* (2013.01); *F02C 3/10* (2013.01); *F02C 6/14* (2013.01);
(Continued)

(58) Field of Classification Search
CPC ............................................. F02C 7/26–7/277
See application file for complete search history.

(56) References Cited

U.S. PATENT DOCUMENTS 5,899,411 A    5/1999  Latos et al.
9,267,438 B2 *  2/2016  Dooley ..................... F02C 7/26
(Continued)

FOREIGN PATENT DOCUMENTS

EP    2052967 A1    4/2009
FR    2914697 A1    10/2008
JP    62-180966 A    8/1987

OTHER PUBLICATIONS

International Search Report dated Nov. 17, 2015, in PCT/FR2015/052119, filed Jul. 31, 2015.

*Primary Examiner* — Fritz M Fleming
(74) *Attorney, Agent, or Firm* — Oblon, McClelland, Maier & Neustadt, L.L.P.

(57) ABSTRACT

The rapid assistance device applies to a free turbine engine of an aircraft having at least a first free turbine engine provided with a gas generator and associated with an electrical machine capable of operating both as a starter and as a generator, the first engine being capable of being put into a standby mode or into an unwanted shut-down mode, the electrical machine being powered from on on-board electri- (Continued)

cal energy power supply network. The device further includes at least one electrical energy storage member adapted to be electrically connected to the electrical machine associated with the first engine in order to provide a burst of assistance to the gas generator of that engine. The electrical energy storage member constitutes a non-rechargeable "primary" energy storage member that can be used once only. The device includes a system for activating the electrical energy storage member and a device for coupling the electrical energy storage member with an electrical power supply system of the electrical machine.

15 Claims, 3 Drawing Sheets

(51) Int. Cl.
| | |
|---|---|
| *F02C 7/32* | (2006.01) |
| *F01D 15/10* | (2006.01) |
| *F02C 3/10* | (2006.01) |
| *F02C 6/14* | (2006.01) |
| *H01M 10/42* | (2006.01) |
| *H01M 10/04* | (2006.01) |
| *H01M 10/625* | (2014.01) |
| *H01G 11/78* | (2013.01) |
| *H01G 11/08* | (2013.01) |
| *H01G 11/14* | (2013.01) |

(52) U.S. Cl.
CPC ............... *F02C 7/32* (2013.01); *H01G 11/08* (2013.01); *H01G 11/14* (2013.01); *H01G 11/78* (2013.01); *H01M 10/04* (2013.01); *H01M 10/425* (2013.01); *H01M 10/625* (2015.04); *F05D 2220/32* (2013.01); *F05D 2270/09* (2013.01); *H01M 2010/4271* (2013.01); *H01M 2220/20* (2013.01)

(56) References Cited

U.S. PATENT DOCUMENTS

| | | |
|---|---|---|
| 2005/0008929 A1 | 1/2005 | Brede et al. |
| 2009/0113871 A1 | 5/2009 | Certain |
| 2010/0058731 A1 | 3/2010 | Haehner et al. |
| 2013/0086919 A1* | 4/2013 | Dooley ................. F02C 7/26 60/778 |
| 2017/0096233 A1* | 4/2017 | Mercier-Calvairac .... F02C 7/36 |
| 2017/0152055 A1* | 6/2017 | Mercier-Calvairac .. F02C 7/268 |
| 2017/0175643 A1* | 6/2017 | Besse ................. F02C 7/262 |
| 2017/0184032 A1* | 6/2017 | Poumarede ............. F02C 7/275 |

* cited by examiner

FIG.5

RAPID ASSISTANCE DEVICE FOR A FREE TURBINE ENGINE OF AN AIRCRAFT

TECHNICAL FIELD

The invention lies in the field of free turbine engines, of the kind commonly to be found on helicopters.

It should be recalled that a gas turbine engine (GT) having a free turbine comprises a power turbine or free turbine that, in a helicopter, drives the rotors of the helicopter via an overrunning clutch, or "freewheel", and a main gearbox (MGB), and that the engine also comprises a gas generator that is constituted mainly by a compressor, a combustion chamber, and a high pressure turbine.

Stepdown gearing or an accessory gearbox serves to connect the shaft of the gas generator to an electrical machine (abridged EM) constituted by a stator and a rotor and capable of operating equally well as a motor (starter) or as a generator. In motor mode, the electrical machine is powered by an electrical energy source and it develops driving torque so as to drive the gas generator of the engine in rotation, in particular for the purpose of starting it, thereby providing assistance on starting. In generator mode, the electrical machine is driven in rotation by the gas generator so as to enable mechanical power to be taken off and then converted into electrical power.

STATE OF THE ART

For a twin-engined aircraft in cruising flight, Documents FR 2 967 132 and FR 2 967 133 propose putting one of the two engines in a standby mode so as to desynchronize its free turbine from the main gearbox, while increasing the power delivered by the other engine, thereby enabling overall fuel consumption of the system to be reduced.

The invention thus lies in particular in the context of a helicopter having at least two engines, and of reducing its fuel consumption while it is performing cruising flight, i.e. during a stage of flight that is characterized by relatively little power being required from each engine, thus giving rise to specific consumption (abridged SC) that is very high. To make cruising flight economic, one of the engines is put on standby, so that the other engine operates at high power, thereby making it possible for the helicopter to benefit from specific consumption that is much lower.

Several variants of this standby mode have been proposed.

In a first variant, referred to as "super idle", the gas generator of the desynchronized gas turbine is regulated at a slow idling speed.

In a second variant, referred to as "assisted super idle", the gas generator of the gas turbine that is desynchronized from the MGB is likewise regulated on a low idling speed, and simultaneously assistance drive torque is applied to the gas generator via the electrical machine and the accessory gearbox.

In a third variant, the combustion chamber of the engine is totally extinguished, and it is then proposed to maintain the gas generator in rotation at a speed suitable for facilitating reignition at the end of the stage of cruising flight. The range of speeds that are suitable may be referred to as a preferred ignition window. This mode of operation, referred to as "turning" mode, requires prolonged assistance to be given to the gas generator.

In all three of those modes of operation, which are likely to be maintained throughout the duration of cruising flight, the amount of power transmitted to the MGB by the engine on standby is generally zero, and it is generally not possible to take power from its gas generator.

In the three above-mentioned variants, it is necessary to be able to reactivate the desynchronized engine rapidly, in particular in an emergency situation, e.g. in the event of another engine failing, if there are three or more engines in all,—or in the event of the other engine failing if there are two engines. Specifically, that is the reason why the gas generator is kept rotating at a speed for facilitating reignition in the system where the combustion chamber is extinguished.

Maintaining the gas generator rotating in the preferred ignition window ("turning" mode) and providing prolonged assistance to the gas generator when it is regulated to idle ("assisted super idle" mode) both require relatively low power, but end up requiring a large amount of energy, since the advantage of the system lies in using it throughout a long duration of flight.

Among other solutions, Documents FR 2 967 132 and FR 2 967 133 propose using an electric starter powered by a starter/generator connected to the gas generator of the other engine, or to a generator driven directly or indirectly by the free turbine of the other engine.

Emergency restarting from a low speed situation, or from a combustion chamber extinguished situation requires high power to be applied to the shaft of the gas generator because of the large amount of inertia of its rotating assemblies and because of the opposing torque from the compressor of the engine. That power needs to be delivered over a duration that is brief, of the order of a few seconds, in order to enable the engine to be started rapidly.

In Document FR 2 967 133, among other solutions, it is suggested that electrical energy, in particular from a supercapacitor, can be used to provide a burst of assistance to the gas generator.

Document EP 2 581 586 also proposes using two supercapacitors (which are members for storing electricity), each of which is charged by a respective electricity generator driven by the gas generator of one of the two engines, and each of which can be used briefly to start the other engine when it is in a shut-down state.

In this context, a particular object of the present invention is to provide technical means that are practical for use on board an aircraft having at least two engines to provide the "rapid reactivation" function when starting from an economic mode of operation of the turbine, by making use, instead of the conventional electrical starter, of an electrotechnical system that is powered by the on-board network or by a specific electrical energy power supply network and that makes the following various modes of operation possible:

starting a gas turbine on the ground;
economic mode;
reactivating in flight a turbine that was previously in economic mode; and
rapidly reactivating in flight a turbine that was previously in economic mode.

Another object of the present invention is to make it possible on a single-engined aircraft to provide effectively a function of rapidly reactivating an engine in the event of an unwanted shut-down mode occurring, by making use, instead of the conventional electrical starter, of an electrotechnical system that is powered by the on-board network or by a specific electrical energy power supply network.

The invention lies in particular in the context of French patent application No. 14/00753 filed on Mar. 27, 2014, and relates more particularly to providing an electrical system architecture providing means for performing the rapid reactivation mode on the gas turbine in flight in improved manner.

The architectures of electrical systems that have been proposed in the past for hybridizing a gas turbine always make use of a storage element of the "secondary" kind, connected to the high voltage direct current (HVDC) bus and having the function of storing the amount of electrical energy that is necessary for the rapid reactivation mode. The term "secondary" means that such storage elements are rechargeable. Most of them require a battery management system (BMS).

Existing solutions thus present several drawbacks, with the main drawback being as follows:

1/ Independently of the secondary storage technology (Li-ion battery, NiMH, supercapacitor, hybrid capacitors, . . . ), a BMS comprises equipment that is said to be "complex" since it includes power switching devices and makes use of electronics for monitoring the state of charge, the operating parameters, and the state of health of the storage member, and is therefore governed by avionics certification standards, such as the DO-178 and DO-254 standards of the radio technical commission for aeronautics (RTCA).

A BMS increases the weight of the system and its probability of failure.

2/ Known secondary couples have a non-negligible self-discharge rate, which makes it essential for the battery to be recharged periodically and thus requires the presence of a charger, either on board the aircraft, or in ground infrastructures.

3/ Secondary couples degrade little by little even when they are used rarely (calendar aging). This means that they must be tested and replaced periodically.

4/ Such secondary storage members also have the drawback of being active at all times, i.e. the system can provide electrical energy at any moment in unwanted circumstances such as short circuits, or they can become discharged prematurely as a result of a leakage current phenomenon.

5/ Such secondary storage members have another general drawback of poorly withstanding severe environments, such as high and low temperatures, and also poorly withstanding mechanical stress (vibration, impacts). In order to accommodate such environmental constraints, secondary members need to be dimensioned accordingly, which leads to a regrettable increase in the weight of a system for mounting on board an aircraft and more particularly on board a helicopter.

6/ Another drawback of certain technologies for secondary storage members is the danger such elements present in the event of thermal runaway, where thermal runaway can be caused in particular by short circuits that are external or internal to the secondary storage members, by overloading, or by other causes, in particular environmental causes.

7/ Coupling a secondary storage unit to the on-board network is problematic given the interactions between the network having a voltage that may vary at any time, and a secondary battery having a voltage that is a function of its state of charge. It is therefore necessary to take precautions (which make the system more complex) in order to avoid any electrical risk, or indeed any risk of the storage unit not being operationally available.

SUMMARY OF THE INVENTION

In order to remedy the above-mentioned drawbacks, the invention proposes an aircraft including at least one first free turbine engine having a gas generator and associated with an electrical machine capable of operating both as a starter and as a generator, the first engine being capable of being put into a standby mode or into an unwanted shut-down mode, the electrical machine being connected to a specific electrical energy power supply network, such as an on-board network, the aircraft further including a rapid assistance device with at least one electrical energy storage member adapted to be electrically connected to said electrical machine associated with said first engine in order to provide a burst of assistance to the gas generator of that engine, the aircraft being characterized in that said electrical energy storage member constitutes a non-rechargeable "primary" energy storage member suitable for use once only after activation, to the exclusion of any "secondary" energy storage member comprising a storage battery, a supercapacitor, or a hybrid capacitor configured to be rechargeable and to be activated permanently, and in that the rapid assistance device includes means for activating the electrical energy storage member and coupling means for coupling the electrical energy storage member with an electrical power supply system of said electrical machine.

In a first possible embodiment, the electrical energy storage member comprises a ready-for-use device with low self-discharge incorporating an anode and a cathode in contact with an electrolyte.

In a second possible embodiment, the electrical energy storage member comprises a device that is inert prior to activation, incorporating an anode, a cathode, and an electrolyte that does not wet the anode and the cathode.

Under such circumstances, the electrical energy storage member may comprise a battery with separate electrolyte, having a separate tank for storing the electrolyte and means for releasing the electrolyte from the separate tank in order to enable it to come into contact with the anode and the cathode on activating the electrical energy storage member.

As an alternative, the electrical energy storage member may comprise a thermopile adapted to keep the electrolyte solid at ambient temperature during storage and to liquefy the electrolyte by heating on activation of the electrical energy storage member.

The means for activating the electrical energy storage member may comprise pyrotechnic activation means.

In another possible embodiment, the means for activating the electrical energy storage member comprise electrical activation means.

In a particular embodiment, the electrical energy storage member is connected in parallel with said specific electrical power supply network, which may be a direct current (DC) electrical energy power supply network. A non-return diode may be interposed, where necessary, between the electrical energy storage member and the DC on-board network. The DC on-board network is itself normally powered by the alternating current (AC) on-board electrical energy power supply network via a rectifier member or an alternating current to direct current (AC/DC) converter.

In another particular embodiment, the electrical energy storage member is connected in series with the rectifier member or the AC/DC converter that produces the voltage of the DC network from the specific electrical energy power supply network such as an AC on-board network, and in parallel with a diode.

The diodes may be semiconductors or controlled switches of electromechanical type or of static type.

In general manner, the electrical energy storage member may comprise one or more elements or sets of elements connected in series, in parallel, or in series-parallel.

In a particular embodiment, the invention applies to an aircraft including a plurality of free turbine engines, each having a gas generator and each associated with an electrical machine capable of operating both as a starter and as a generator, at least one of the plurality of engines being capable of being put in a standby mode, while at least one other one of the plurality of engines is in a mode of normal operation.

Under such circumstances, in a particular embodiment, the rapid assistance device of the invention has a single electrical energy storage member adapted to be electrically connected via a switch device to the electrical machine that is associated with that one of the plurality of engines that requires a burst of assistance to the gas generator of the engine previously put on standby.

The invention provides an aircraft having at least one free turbine engine and including an assistance device as mentioned, which aircraft may in particular be a helicopter.

BRIEF DESCRIPTION OF THE FIGURES

Other characteristics and advantages of the invention appear from the detailed description of particular embodiments of the invention given with reference to the accompanying drawings, in which.

DETAILED DESCRIPTION

Figure 3:
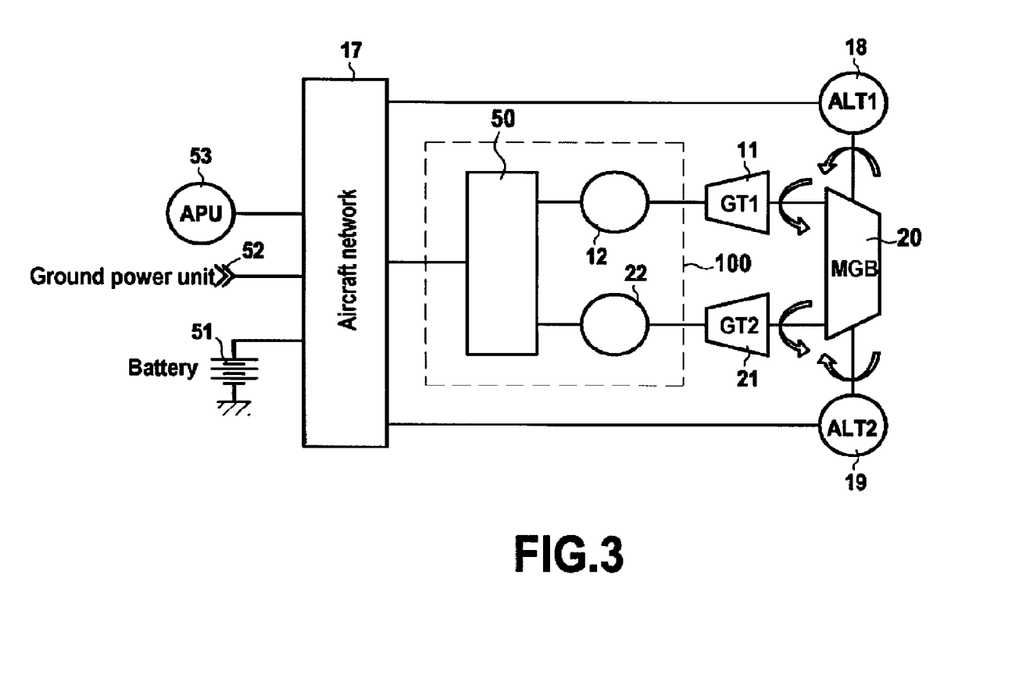
FIG. 3 is a diagram showing a system of the invention integrated in the propulsion and electrical systems of an aircraft.

With reference to FIG. 3, the general electrical architecture of an example system to which the invention is applicable is as follows. Electricity is generated on an aircraft by at least two alternators (abridged ALT1 and ALT2) 18, 19 that are driven by a main gearbox (MGB) 20, and typically constituted by "3-stage" type machines delivering AC at 115 volts (V) and at a frequency of 400 hertz (Hz), it being possible to envisage other rotary machines.

This architecture is advantageous in the context of economic cruising flight on one engine, since it guarantees functional and organic independence between generating electricity and operating the turboshaft engines 11, 21, thus making it possible to retain a sufficient level of availability and of redundancy for generating electricity when in economic cruising flight, while one of the two engines 11, 21 is kept on standby, which is not compatible with taking any power from the gas generator of that engine operating on standby.

In addition, this architecture is less penalizing for the operation of the engines 11, 21 than taking power from the gas generators of the engines 11, 21, in particular in terms of impact on their acceleration and on their specific consumption performance, insofar as the electrical power consumed by the on-board network 17 of the aircraft is taken mechanically from the free turbine and not from the gas generator.

The alternators 18, 19 (ALT1 and ALT2) power the electricity network 17 of the aircraft. Thus, the on-board network 17 is powered by one or more alternators 18, 19 that are driven directly or indirectly via at least one of the engines 11, 21. When one of the engines 11, 21 is shut down, it is necessarily the other engine that powers the on-board network 17 in prolonged manner.

Nevertheless, there may be other sources of energy available for powering the network 17 and serving in particular for powering all of the electrical system 100 associated with the engines 11, 21, which other sources may be constituted by an on-board auxiliary power unit 53 (abridged APU), by one of more storage batteries 51, or indeed, when on the ground, by a ground power unit 52.

The main gearbox 20 (MGB) is driven by the engines 11, 21. In this embodiment they are free turbine turboshaft engines. Each of them comprises a gas generator and a power turbine (free turbine) driving the MGB 20 via an overrunning clutch, or "freewheel".

Each engine 11, 21 is associated with a respective rotary machine 12, 22 that is suitable for operating both as a starter and as a generator, and that can be powered from the on-board network 17 of the aircraft via an electrical control system 50 that includes the device of the invention.

First and second embodiments of the invention are described with reference to FIGS. 1 and 2. In addition to the engines 11 and 21 and the AC on-board network 17, FIGS. 1 and 2 show embodiments of the electrical assembly 100 of FIG. 3 constituting an electrical starter system that can be applied to the engine 11 or to the engine 21.

Figure 1:
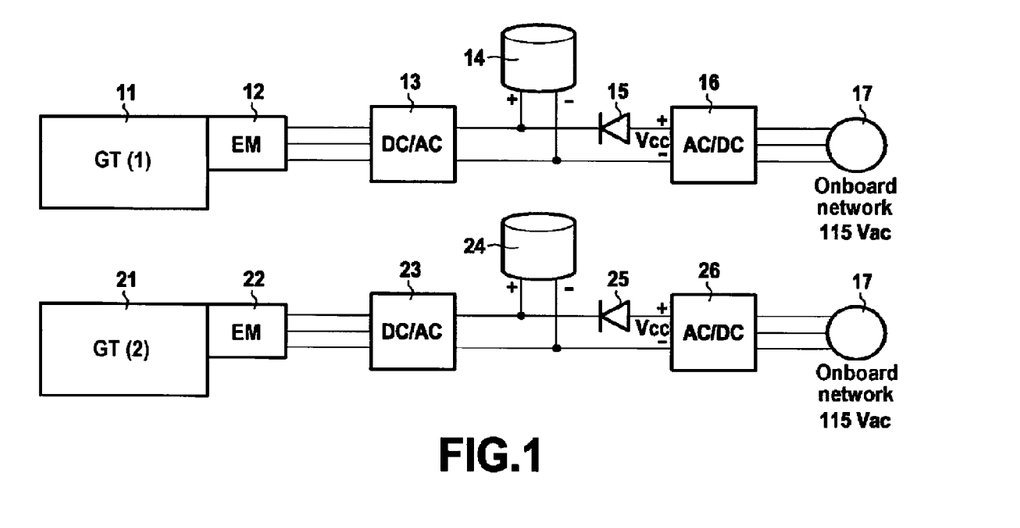
FIG. 1 is a diagram of a rapid assistance device in a first embodiment of the invention, with a primary energy member connected in parallel with an on-board network of an aircraft.
Figure 2:
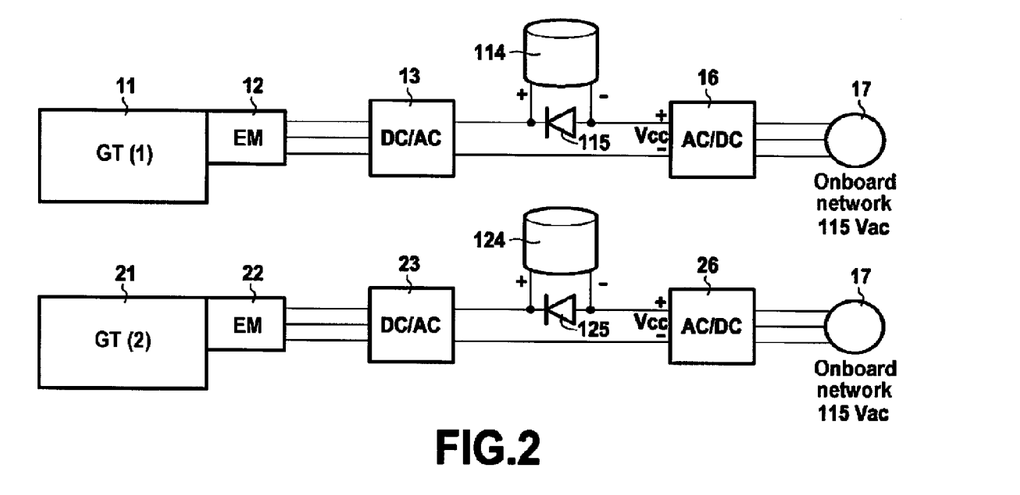
FIG. 2 is a diagram of a rapid assistance device in a second embodiment of the invention, with a primary energy member connected in series with an on-board network of an aircraft.

In the embodiment of FIG. 1, it can be seen that the engine 11 has an electrical starter system comprising an alternating current to direct current converter 16, also referred to as an AC/DC converter, which is powered from the AC on-board network 17, and a direct current to alternating current converter 13, also referred to as a DC/AC converter, connected to the AC/DC converter 16 and serving to power the electrical machine 12, also referred to as the EM. The AC on-board network 17 and the AC/DC converter 16 define a DC electrical power supply network (output voltage Vcc), however other DC network embodiments are possible.

In accordance with the invention, a diode 15 may be connected between the DC/AC converter 13 and the AC/DC converter 16. This diode is useful when the DC network is used by equipment other than the EM 12. It serves to reserve for the EM 12 all of the power produced by the storage unit 14 (described below) when the voltage produced by the storage unit 14 is greater than the voltage Vcc of the DC network. It enables the DC network to contribute to powering the EM 12 when the voltage produced by the storage unit 14 is less than the voltage Vcc of the DC network. The anode of the diode 15 is connected to the positive pole of the output from the AC/DC converter 16, and the cathode of the diode 15 is connected to the positive pole of the DC/AC converter 13. Naturally, and in equivalent manner, the cathode of the diode 15 could be connected to the negative pole of the output from the AC/DC converter 16, with the anode of the diode 15 being connected to the negative pole of the DC/AC converter 13. The diode 15 may be a semiconductor, or a controlled switch that may be static or electromechanical.

Furthermore, a primary storage unit 14, i.e. a non-rechargeable electrical energy storage member suitable for single use, is connected in parallel with the converters 13 and 16, the positive pole of the primary storage unit 14 being connected to the cathode of the diode 15 and the negative pole of the primary storage unit being connected to the negative poles of the converters 13 and 16.

The primary storage unit 14 is optimized for power discharges that are short and intense. By way of example, it may be a ready-for-use device with low self-discharge that incorporates an anode and a cathode in contact with an electrolyte.

Nevertheless, the primary storage unit 14 could be a device that is inert prior to being activated, incorporating an anode, a cathode, and an electrolyte that does not wet the anode and the cathode.

Under such circumstances, the electrical energy storage member 14 may comprise a battery with electrolyte that is separate, the battery having a separate tank for storing the electrolyte together with means for releasing the electrolyte from the separate tank so as to enable it to come into contact with the anode and the cathode when the electrical energy storage member 14 is activated.

Alternatively, for a device that is inert prior to being activated, the electrical energy storage member 14 may comprise a thermopile adapted to keep an electrolyte solid at ambient temperature during storage and to liquefy the electrolyte by heating when the electrical energy storage member 14 is activated.

The primary electrical storage unit 14 is activated when the engine 11 needs to be restarted in an emergency.

By way of example, the means for activating the electrical energy storage member 14 may comprise pyrotechnic activation means, or indeed mechanical activation means, or indeed electrical activation means.

In the embodiment of FIG. 1, the electrical energy storage member 14 is connected in parallel with the on-board DC electrical power supply network Vcc, but because a diode 15 is interposed between the electrical energy storage member 14 and the AC/DC converter 16 that is powered by the AC on-board network 17, when the electrical energy storage member 14 is activated by activation means (not shown in the drawings) in order to deliver the energy needed for rapidly reactivating the engine 11 that was previously on standby, the voltage across the terminals of the storage member 14 may be greater than the voltage level Vcc of the DC network as delivered by the on-board network 17 associated with the AC/DC converter 16. The diode 15 then has a negative potential difference between its anode and its cathode and is in a non-conductive state. The electrical energy needed for rapidly reactivating the gas turbine of the engine 11 is thus delivered entirely by the primary energy storage unit 14, which presents the advantages of delivering all of the power supplied by the storage unit 14 to the EM 12, without raising the voltage Vcc of the DC on-board network of the aircraft.

When the voltage delivered by the storage unit 14 loaded by the DC/AC converter 13 and the EM 12 is less than the voltage Vcc of the DC network, the diode 15 conducts, thereby enabling the DC network to contribute to powering the EM 12.

Finally, if it is desired that the DC network does not participate in powering the EM 12 when the voltage from the storage unit 14 is less than that of the DC network, and given that the diode 15 may be a controlled switch, as mentioned above, it is possible to control the switch 15 so that it does not conduct under such circumstances.

FIG. 1 shows elements 23 to 26 co-operating with the second engine 21 and the second electrical machine 22, which elements correspond respectively to the elements 13 to 16 co-operating with the first engine 11 and with the first electrical machine 12. The elements 23 to 26 are not described again. The elements 23 to 26 perform roles analogous to those of the above-described elements 13 to 16, when it is the engine 11 that is operating at a high power rating while the engine 21 is on standby and might need to be reactivated rapidly.

Since it is never necessary to restart both engines 11 and 12 at the same time, it is possible to have only one on-board storage unit 14 for restarting one or the other of the two engines 11 and 21. An electrical or electromechanical switch member 38, 48 connects the single storage unit 14 either to the DC/AC converter 13 (as shown in FIG. 4 with the switch 38 in the closed position and the switch 48 in the open position), or else to the DC/AC converter 23, depending on requirements.

Figure 4:
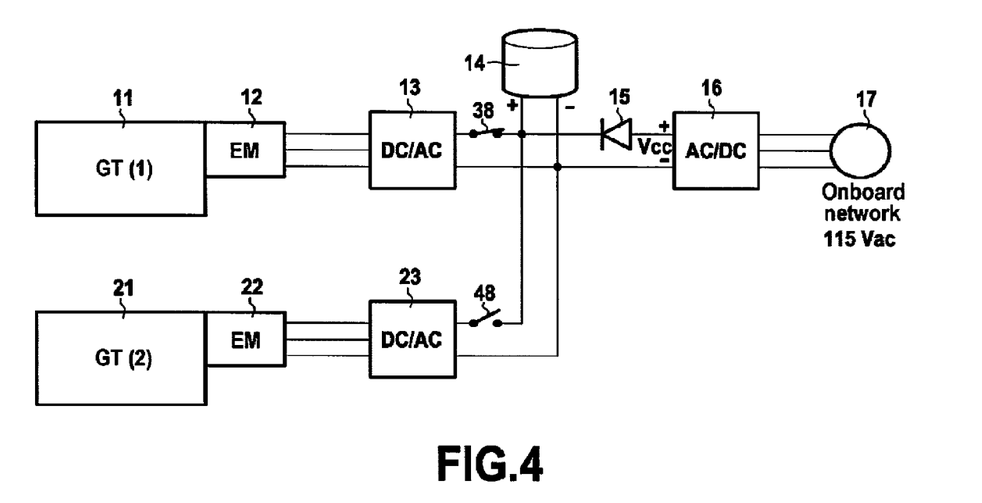
FIG. 4 is a diagram of a rapid assistance device in a third embodiment of the invention, with a single primary energy member connected in parallel with an on-board network of an aircraft.

As shown in FIG. 4, it is possible to use not only a single storage unit 14, but also a single diode 15 and a single AC/DC converter 16, providing switch members 38, 48 are available so that the storage unit 14 sends its energy to the EM 12 or to the EM 22. The embodiment of FIG. 4 thus differs from the embodiment of FIG. 1 by omitting the elements 24 to 26. Furthermore, the switching function is very simple to implement using contactors 38 and 48, i.e. simple on/off switches for the DC/AC converters 13 and 23.

In a variant, the DC/AC converter 23 of FIG. 4 could also be omitted. Under such circumstances, it is possible to omit the on/off switches 38 and 48, with on/off switches being arranged not at the DC inputs of the DC/AC converters 13 and 23, but at the interface between the EMs 12 and 22 and the AC output from the DC/AC converter 13.

Thus, the systems of elements 13 to 16 and 23 to 26 can be implemented in full or in part by using single elements, the switching taking place where the systems duplicate each other.

It is also possible to make provision for only one of the engines, e.g. the engine 11, to be suitable for being put on standby, while the other engine 21 always operates at high power, in which case the elements 24 and 25 could be omitted without a switching function being necessary, since no rapid reactivation needs to be performed for the second engine 21.

FIG. 2 shows another embodiment that is analogous to the embodiment of FIG. 1 and includes similar elements that are given the same reference numbers and are not described again, but in which the respective primary storage units 114 and 124 are associated with respective diodes 115 and 125.

Thus, in FIG. 2, in the second embodiment of the invention, there can be seen a primary storage unit 114, i.e. a non-rechargeable electrical energy storage member suitable for single use, that is connected in parallel with a diode 115 between the converters 13 and 16, the negative pole of the primary storage unit 114 being connected to the anode of the diode 115 and to the positive pole of the AC/DC converter 16, and the positive pole of the primary storage unit 114 being connected to the cathode of the diode 115 and to the positive pole of the DC/AC converter 13.

When the primary storage unit 114 is not in operation, the EM 12 can be powered by the DC on-board network via the diode 115. If the engine 11 that was previously on standby needs to be rapidly reactivated, the diode 115 becomes non-conductive and the primary storage unit 114 is connected in series with the converters 13 and 16.

Thus, when the primary energy storage unit is activated, it is in series switch the on-board network 17 associated with the AC/DC converter 16. The electrical energy needed for rapidly reactivating the gas turbine of the engine 11 is delivered by the primary energy storage unit 114 and by the on-board network 17, which, in comparison with the solution of the embodiment shown in FIG. 1, enables the energy storage unit 114 to be underdimensioned in terms of the power and the energy it is to deliver. Nevertheless, the DC/AC converter 13 then needs to be dimensioned so as to accommodate the resulting voltage and be capable of passing all of the electrical power needed for rapid reactivation.

The solution of the embodiment in FIG. 2 makes it possible to optimize the power supply voltage during rapid reactivation, which voltage is the sum of the voltage delivered by the primary storage unit 114 plus the voltage Vcc output from the rectifier 16, thereby making it possible to minimize the current flowing in the overall electrical circuit. The storage unit 114 may be dimensioned so as to deliver a voltage that is lower than the voltage level generated in the FIG. 1 solution, thereby presenting the advantage of reducing the weight and the bulk of this member.

Compared with the solution of the embodiment of FIG. 1, the solution of the embodiment of FIG. 2 is not independent of the on-board network 17, such that in certain applications it may be necessary to add filter elements upstream from the converter 16 in order to comply with requirements for network stability.

In the embodiment of FIG. 2, the elements 23, 124, 125, and 26 associated with the second engine 21 and with the second electrical machine 22 perform the same roles respectively as the elements 13, 114, 115, and 16 associated with the first engine 11 and with the first electrical machine 12, but are involved when it is the second engine 21 that is put on standby and might need to be reactivated rapidly, while the first engine 11 is operating at high power.

As in the first embodiment, it is nevertheless possible to switch a single storage unit 114 to the engine 11 or to the engine 21, or else for example to allocate the role of being in standby mode to the first engine 11 only, in which case it is possible to omit the elements 124 and 125.

Figure 5:
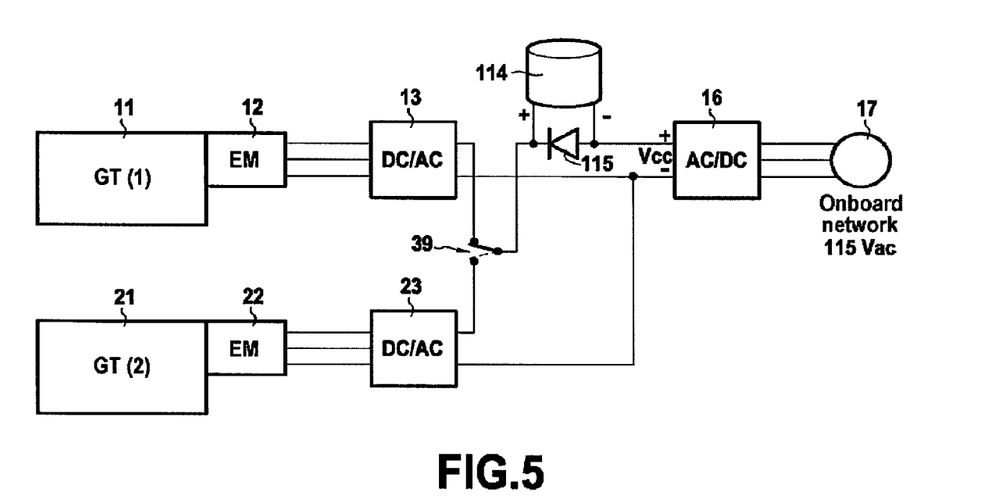
FIG. 5 is a diagram of a rapid assistance device in a fourth embodiment of the invention, with a single primary energy member connected in series with an on-board network of an aircraft.

FIG. 5 shows a particular embodiment in which a single storage unit 114, a single diode 115, and a single AC/DC converter 16 are used. As in FIG. 4, it is then possible to use two on/off switches 38 and 48 or merely to apply on/off control to the DC/AC converters 13 and 23, or to use a changeover member 39 (shown in FIG. 5), which may be a simple switch, for selecting between having the single storage unit 114 in series with the DC/AC converter 13 (position shown in FIG. 5) or in series with the DC/AC converter 23. In a variant, as in the embodiment of FIG. 4, it is possible to omit the DC/AC converter 23 and use a single DC/AC converter 13. Under such circumstances, switching should be performed not at the DC input of the DC/AC converter 13, but at its AC output.

The nature of the storage member 24, 114, or 124 can be entirely analogous to that described above with respect to the storage member 14.

In the present invention, the storage member 14 or 114, or 24 or 124 as the case may be, that is integrated in the electrical system of an engine that might be put on standby, i.e. the engine 11 or the engine 21 as the case may be, is necessary in order to enable the corresponding gas turbine that is initially in standby mode to be reactivated rapidly, e.g. because of a problem with the gas turbine that was operating previously. The above-described situation is assumed to be extremely rare, and it necessarily requires a maintenance operation to be performed subsequently on the gas turbine. It therefore appears that there is no major drawback in the storage member 14 or 114, or 24 or 124 as the case may be, being a storage unit that can be used once only and that needs to be replaced when performing maintenance on the engine.

In this concept where the storage member 14 or 114, or 24 or 124 as the case may be, is a one-shot member, it becomes possible to use so-called "primary" storage technology, i.e. the storage units are not rechargeable.

As mentioned above, primary couples come in two families:

1/ Family of Primary Couples that are Ready for Use

In this situation, the electrolyte wets the anode and the cathode.

Various high-performance primary couples are in existence that present very low self-discharge, so they do not degrade over time, and thus do not require periodic recharging, thereby making it possible to avoid using a battery management system (BMS) which constitutes equipment that is complex and also increases both the weight of the system and its probability of failing.

By way of example, mention may be made of the following couples Li—$SO_2$, Li—$MnO_2$, $LiSOCl_2$, Zn—$MnO_2$ (saline or alkaline), Zn—$Ag_2O$, this list not being exhaustive.

2/ Family of Inert Primary Couples

Their electrolyte does not wet the anode and the cathode. This family comprises two sub-families:

2.1/ A battery with a separate electrolyte: the electrolyte is taken from an auxiliary tank, and is released on activation.

By way of example, mention may be made of the silver-zinc (Zn—$Ag_2O$) couple, this list not being exhaustive.

2.2/ Thermopile: the electrolyte is solid at ambient temperature and is heated and thus liquefied very quickly on activation.

By way of example, mention may be made of the $Ca/CaCrO_4$ and $Li/FeS_2$ couples, this list not being exhaustive.

These couples have the advantage of being electrically and chemically inert so long as they are not activated.

They provide a solution to all of the prior art drawbacks that make use of electrical energy storage members of the so-called "secondary" type.

a/ They do not require a BMS.

b/ No self-discharge takes place. There is no need to charge them.

c/ No degradation takes place over time and they can be guaranteed for a period of 15 or 20 years, for example.

d/ There is no electrical danger nor any risk of unwanted discharge, since the energy storage members 14, 114, 24, 124 are electrically inert.

e/ Since the energy storage members 14, 114, 24, 124 are chemically inert, they withstand severe environmental conditions very well.

f/ There is no risk of thermal runaway in the inert state.

g/ When the energy storage members 14, 114, 24, 124 are in an inactive state, they have the property whereby the insulation resistance between the + and − polarities of the storage member is very high, thus enabling such a member to be installed in an electrical architecture without taking prior precautions, and an electrically inert battery can thus be coupled to the on-board network 17 very simply by means of a parallel connection (the storage unit 14 is in an insulating state) or a series connection (the storage unit accommodates the zero voltage state).

Even though the present description states that the storage unit 14 or 114, 24, or 124 is single in terms of a functional entity, it should be observed that it need not be constituted by a single member, but could in fact comprise one or more couples or sets of couples connected in parallel, or in series, or in series-parallel.

Furthermore, the description above relates to two engines 11 and 21, however the invention applies in the same manner to a smaller or greater number of engines that can be used on a single aircraft, with one or more devices of the invention, or with a device of the invention having switching, being applied to one or more of the engines.

When a single-engined aircraft has a single engine 11, corresponding to the situation of the embodiments of FIGS. 1 and 2 in which there exists only the upper system of elements co-operating with the engine 11, the storage unit 14 or 114 serves to provide rapid assistance in order to deliver a burst of rapid assistance to the gas generator of the engine 11 in the event of the engine 11 being shut down in unwanted manner while in flight.

In general manner, the invention is not limited to the embodiments described, but extends to any variant within the ambit of the scope of the accompanying claims.

The invention claimed is:

1. An aircraft including at least one first free turbine engine having a gas generator and associated with an electrical machine capable of operating both as a starter and as a generator, the first engine being capable of being put into a standby mode or into an unwanted shut-down mode, the electrical machine being connected to a specific electrical energy power supply network, the aircraft further including a rapid assistance device with at least one electrical energy storage member adapted to be electrically connected to said electrical machine associated with said first engine in order to provide a burst of assistance to the gas generator of that engine, wherein said electrical energy storage member constitutes a non-rechargeable "primary" energy storage member suitable for use once only after activation, to the exclusion of any "secondary" energy storage member comprising a storage battery, a supercapacitor, or a hybrid capacitor configured to be rechargeable and to be activated permanently, and wherein the rapid assistance device includes means for activating the electrical energy storage member and coupling means for coupling the electrical energy storage member with an electrical power supply system of said electrical machine.

2. The aircraft according to claim 1, wherein the electrical energy storage member comprises a ready-for-use device with low self-discharge incorporating an anode and a cathode in contact with an electrolyte.

3. The aircraft according to claim 1, wherein the electrical energy storage member comprises a device that is inert prior to activation, incorporating an anode, a cathode, and an electrolyte that does not wet the anode and the cathode.

4. The aircraft according to claim 3, wherein the electrical energy storage member comprises a battery with separate electrolyte, having a separate tank for storing the electrolyte and means for releasing the electrolyte from the separate tank in order to enable the electrolyte to come into contact with the anode and the cathode on activating the electrical energy storage member.

5. The aircraft according to claim 3, wherein the electrical energy storage member comprises a thermopile adapted to keep the electrolyte solid at ambient temperature during storage and to liquefy the electrolyte by heating on activation of the electrical energy storage member.

6. The aircraft according to claim 1, wherein said means for activating the electrical energy storage member comprise pyrotechnic activation means.

7. The aircraft according to claim 1, wherein said means for activating the electrical energy storage member comprise electrical activation means.

8. The aircraft according to claim 1, wherein the electrical energy storage member is connected in parallel with said specific electrical energy power supply network.

9. The aircraft according to claim 8, wherein a diode is interposed between the electrical energy storage member and a rectifier member or an AC/DC converter powered by said specific electrical energy power supply network.

10. The aircraft according to claim 1, wherein the electrical energy storage member is connected in series with a rectifier member or an AC/DC converter powered by said specific electrical energy power supply network, and in parallel with a diode.

11. The aircraft according to claim 10, wherein said diode is constituted by a controlled switch of electromechanical type or of static type.

12. The aircraft according to claim 10, wherein said diode is constituted by a semiconductor element.

13. The aircraft according to claim 1, wherein the electrical energy storage member comprises one or more elements or sets of elements connected in series, in parallel, or in series-parallel.

14. The aircraft according to claim 1, including a plurality of free turbine engines, each having a gas generator and each associated with an electrical machine capable of operating both as a starter and as a generator, at least one of the plurality of engines being capable of being put in a standby mode, while at least one other one of the plurality of engines is in a mode of normal operation.

15. The aircraft according to claim 14, wherein the rapid assistance device has a single electrical energy storage member adapted to be electrically connected via a switch device to said electrical machine that is associated with that one of the plurality of engines that requires a burst of assistance to the gas generator of the engine previously put on standby.

* * * * *